US010198278B2

(12) United States Patent
Kaplan et al.

(10) Patent No.: US 10,198,278 B2
(45) Date of Patent: Feb. 5, 2019

(54) DETERMINING A LABEL SIZE AND CONDITIONS FOR DISPLAYING A TOOLTIP

(71) Applicant: Red Hat Israel, Ltd., Raanana (IL)

(72) Inventors: Alona Kaplan, Raanana (IL); Mike Kolesnik, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 932 days.

(21) Appl. No.: 14/627,921

(22) Filed: Feb. 20, 2015

(65) Prior Publication Data
US 2016/0246614 A1 Aug. 25, 2016

(51) Int. Cl.
*G06F 17/00* (2006.01)
*G06F 9/451* (2018.01)

(52) U.S. Cl.
CPC .............. *G06F 9/453* (2018.02); *G06F 9/454* (2018.02)

(58) Field of Classification Search
CPC .................................................. G06F 9/4446
See application file for complete search history.

(56) References Cited

U.S. PATENT DOCUMENTS

| 6,828,988 | B2* | 12/2004 | Hudson | G06F 17/246 |
| | | | | 715/711 |
| 7,761,796 | B2 | 7/2010 | Faraday et al. | |
| 7,971,155 | B1 | 6/2011 | Yoon | |
| 8,386,961 | B2 | 2/2013 | Buffet et al. | |
| 2009/0043799 | A1 | 2/2009 | Morris | |
| 2009/0044144 | A1 | 2/2009 | Morris | |
| 2010/0199222 | A1* | 8/2010 | Kranik | G06F 19/322 |
| | | | | 715/853 |
| 2011/0107196 | A1* | 5/2011 | Foster | G06F 17/245 |
| | | | | 715/227 |
| 2011/0126158 | A1 | 5/2011 | Fogarty et al. | |
| 2013/0241952 | A1* | 9/2013 | Richman | G06F 17/21 |
| | | | | 345/619 |

FOREIGN PATENT DOCUMENTS

WO 2011127683 A1 10/2011

OTHER PUBLICATIONS

Flex Examples, Keep Your Cloud Private, "Truncating text in the Flex Label control using the truncateToFit property", http://blog.flexexamples.com/2008/01/26/truncating-text-in-the-flex-label-control-using-the-truncatetofit-property/, 10 pages, Jan. 26, 2008.
UnityAnswers, "Trouble with Implementing Tooltip with GUILayout", http://answers.unity3d.com/questions/17802/trouble-with-implementing-tooltip-with-guilayout.html, 2 pages, May 21, 2010.
GTK v1.2 Tutorial: Container Widgets, "10. Container Widgets, http://www.gtk.org/tutorial1.2/gtk_tut-10.html", 17 pages, [retrieved from the internet on Dec. 29, 2014].

* cited by examiner

*Primary Examiner* — Mustafa A Amin
(74) *Attorney, Agent, or Firm* — Lowenstein Sandler LLP

(57) ABSTRACT

A method for determining a label size and conditions for displaying a tooltip includes identifying a label object within a parent object, computing a label width of the label object based at least partially on a layout associated with the parent object, and computing a text width for text data associated with the label object. The method further includes determining a size relationship between the label width and the text width, and determining whether to enable display of a tooltip for the label object based at least partially on the size relationship.

20 Claims, 7 Drawing Sheets

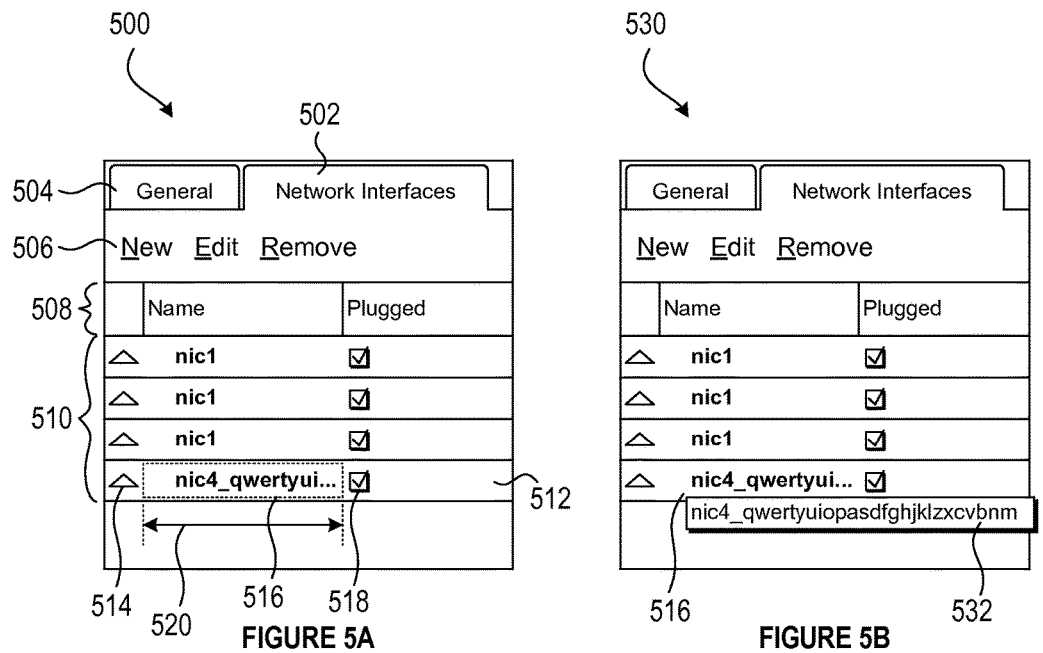
FIGURE 5A
FIGURE 5B
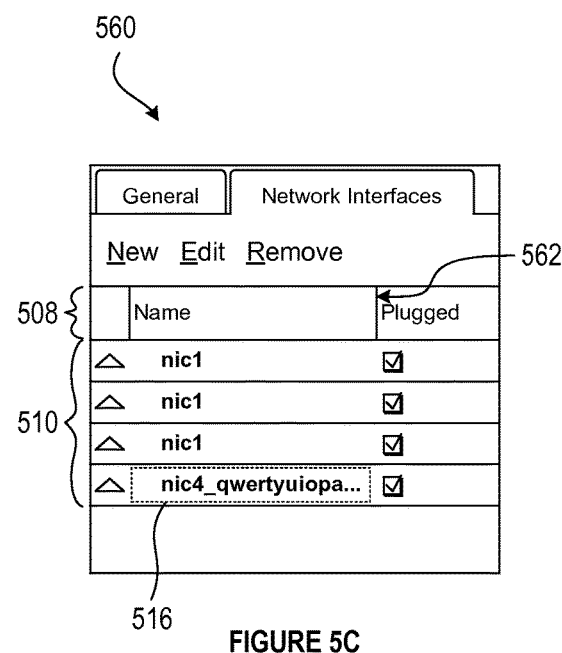
FIGURE 5C

DETERMINING A LABEL SIZE AND CONDITIONS FOR DISPLAYING A TOOLTIP

TECHNICAL FIELD

The embodiments of the disclosure relate generally to a computer system implementing a graphical user interface and, more specifically, relate to determining a label size and conditions for displaying a tooltip for the label.

BACKGROUND

Currently, user interfaces provide tooltips for on-screen labels that are truncated when a width of the text exceeds a pre-defined limit. Cascading Style Sheet (CSS) layouts support truncation of labels in which a total length of the label text exceeds a specified label size. However, if the layout is modified or if text localization is performed, the labels are not dynamically updated, resulting in text that remains unnecessarily truncated. Furthermore, such layouts lack the ability to determine when a tooltip is appropriate for a label when the layout or text is changed.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

FIG. 5A shows an illustrative GUI layout that includes a truncated label according to an embodiment of the disclosure;

FIG. 5B shows an illustrative GUI layout that includes a tooltip for a truncated label according to an embodiment of the disclosure;

FIG. 5C shows an illustrative GUI layout that includes an updated truncated label according to an embodiment of the disclosure;

DETAILED DESCRIPTION

Embodiments of the disclosure are directed to determining a label size and conditions for displaying a tooltip. In particular, a layout management component is provided for dynamically updating a label displayed in a graphical user interface (GUI) in response to, for example, a change in a layout of objects displayed in the GUI. For example, if a width of the text within the label exceeds a newly updated width of the label, the text may be truncated. The layout management component then determines if a tooltip is to be displayed for the label (e.g., in response to a "mouse-over" interaction with the label).

A method of one embodiment includes identifying a label object within a parent object and computing (e.g., by a processing device) a label width of the label object based at least partially on a layout associated with the parent object. The method further includes computing a text width for text data associated with the label object, and determining a size relationship between the label width and the text width. The method further includes determining whether to enable display of a tooltip for the label object based at least partially on the size relationship.

Prior solutions for managing labels in a GUI present several disadvantages. CSS layouts include a text-overflow property that truncates text that exceeds a width of its respective label by replacing a portion of the text with an ellipsis. However, these labels had pre-defined widths, resulting in labels that were not updated in response to a change in the layout of a parent window containing the label. In addition, the layouts failed to support text localization. For example, translated text can be longer or shorter than the original text, and failure to account for these changes often resulted in a broken layout appearance. Another disadvantage is that there was no indication when truncation occurred, and thus no mechanism for determining when a tooltip was or was not appropriate for the label.

Aspects of the present disclosure address the above deficiencies by dynamically calculating a label size and determining conditions for displaying a tooltip. In one example, a maximum size for the label is computed, which may be based on other objects within the GUI. For example, the maximum size of the label may take into account the label's location within a parent window and the overall size of the parent window. Text displayed in the label may be truncated (e.g., by setting the CSS text-overflow property) when the width of the text exceeds the maximum width of the label, and a tooltip may be enabled for the label. Aspects of the present disclosure also support text localization. Localization may trigger a new calculation of the text width, and truncation may be applied or un-applied to the text of the label as a result.

Figure 1:
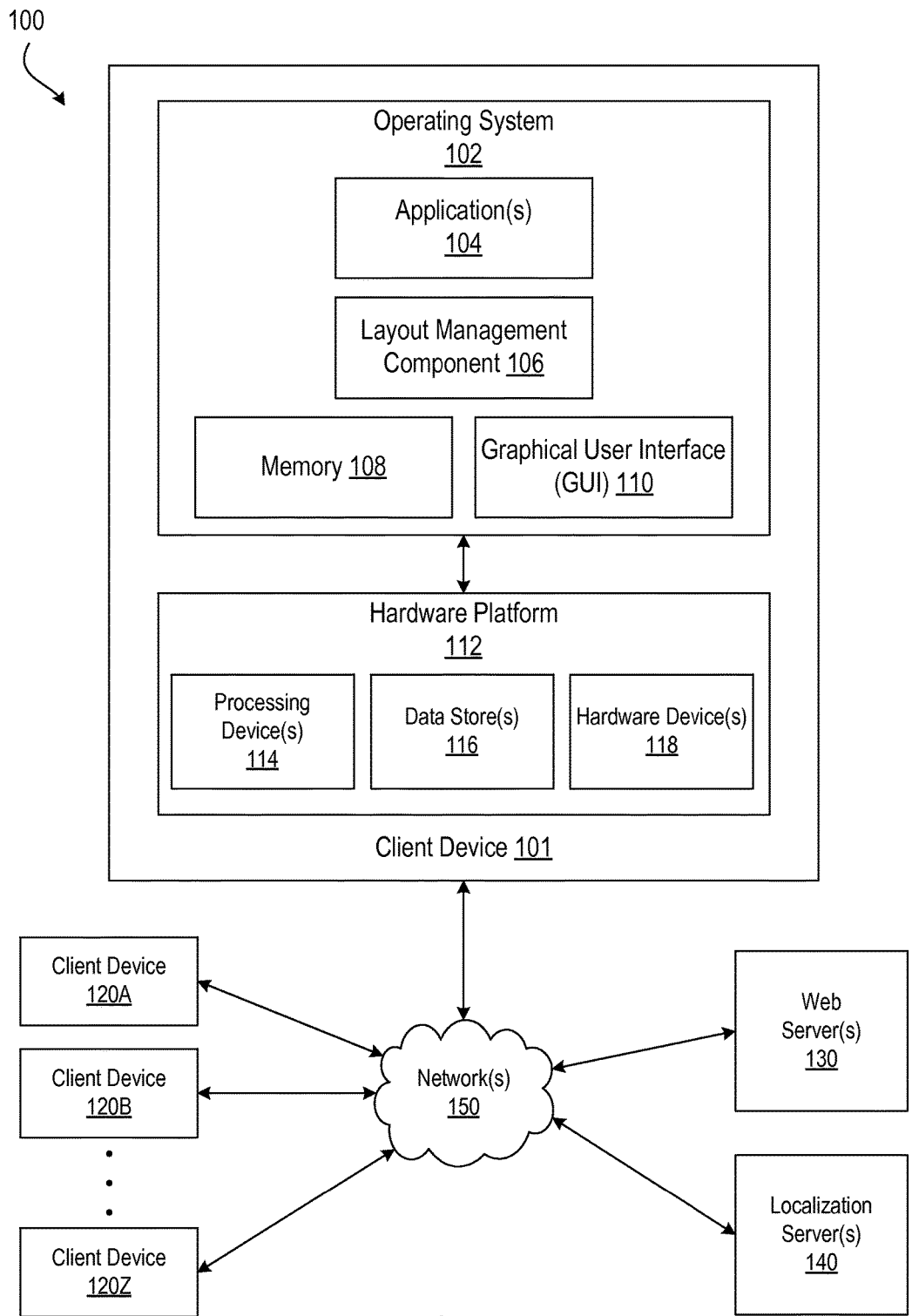
FIG. 1 is a block diagram of a computer system in which the embodiments of the disclosure may operate.

FIG. 1 is a block diagram illustrating a system 100 in which embodiments of the present invention may be implemented. In one embodiment, the system 100 may include an exemplary client device 101 such as, for example, any variety of user devices including, but not limited to, a personal computer (PC), a laptop, a mobile phone, mobile smart phone, a tablet computer, handheld devices, netbooks, or any other computing device. Furthermore, the client device 101 may include a server device, such as a mainframe server device or any other type of server device. The client device 101 includes a hardware platform 112, on top of which runs an operating system (OS) 102. The OS 102 may include Microsoft™, Linux™, Solaris™, Mac™ OS or any other suitable OS for managing operations on the client device 101. The OS 102 may also include a memory 108 (e.g., a virtual memory), and may support one or more applications 104 that utilize a GUI 110. The software applications 104 may include any computer-executable program capable of communicating with the OS 102. Some of these applications may include, but are not limited to, voice mail applications, web applications, Microsoft™ applications, an Eclipse integrated development environment (IDE), and/or other applications. The operating system 102 may also include and implement a layout management component 106, which is described in greater detail below.

The hardware platform 112 may include one or more processing devices for implementing/executing the OS 102. In one embodiment, a data store 116 includes one or more hardware or software devices, which may be located internally or externally to the client device 101. Examples of data store 116 may include, but are not limited to, random-access memory (RAM), non-volatile storage memory (e.g., flash memory, electrically erasable programmable read-only memory (EEPROM), solid state drives (SSD), etc.), magnetic storage memory (e.g., one or more hard drives), and optical memory (e.g., CDs, DVD, Blu-ray drives, etc.). In addition, hardware platform 112 may include one or more additional hardware devices 118, such as network interface cards (NICs), sound or video adapters, photo/video cameras, printer devices, keyboards, displays or any other suitable device that may be communicatively coupled to or integrated with the client device 101.

In one embodiment, the system 100 may include one or more additional client devices 120A-120Z. The client devices 120A-120Z may be any variety of different computing devices, which include but are not limited to, a laptop computer, a handheld computer, a netbook, a desktop, a workstation, a mobile device such as smart phone, a server device, a tablet computing device, or any other type of computing device. In some embodiments, one or more of the client devices 120A-120Z may be identical or similar to the client device 101.

The client device 101 and the client devices 120A-120Z may be communicatively coupled to each other via a network 150. The network may be any type of communication network including, but not limited to, a local area network (LAN), a wide area network (WAN) (e.g., the Internet,) or similar communications network. The network can include any number of network devices and computing devices that are in communication over any combination of wired and wireless communication lines.

The system 100 may also include one or more web servers 130 and one or more localization servers 140. In one embodiment, the web server 130 may be the same or similar to client device 101, and may provide web resources to any requesting device among the client device 101 and the client devices 120A-120Z. For example, the client device 101 may request a web page or web document from the web server 130. The web server 130 may then transmit the web page or web document to the client device 101 via the network 150, and the client device 101 may, in turn, present the web page or web document for display using the GUI 110.

In one embodiment, the localization server 140 provides translation services to one or more of the devices of the system 100. For example, the client device 101 may transmit a request to the localization server 140 to translate text data stored in the memory 108. In one example, the text data may correspond to text data to be displayed in an on-screen label presented for display using the GUI 110. The text may be transmitted with the request to the localization server 140 via the network 150, and translated text may be transmitted back from the localization server 140 to the requesting device, which may overwrite or supplement the original text data.

Figure 2:
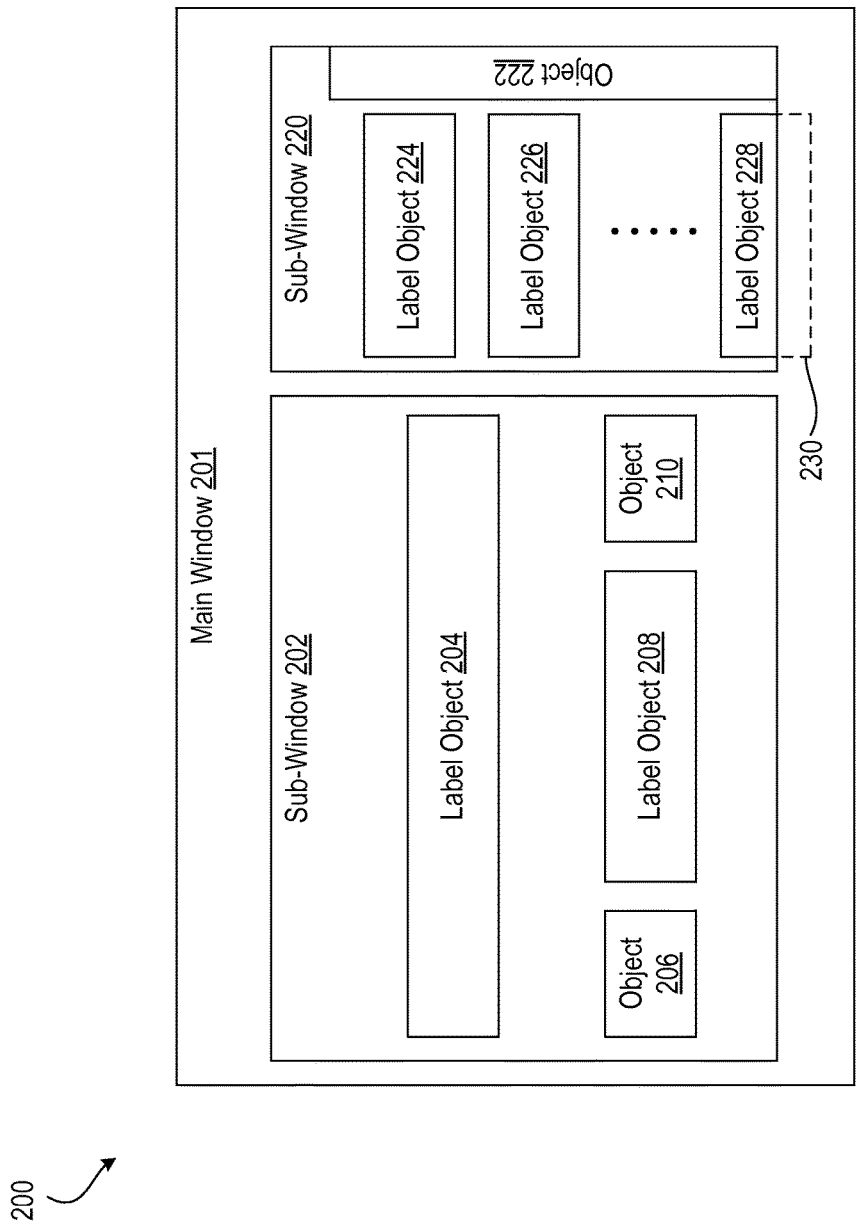
FIG. 2 is a diagram illustrating objects within graphical user interface (GUI) layout according to an embodiment of the disclosure.

Referring once again to the layout management component 106, in one example, the layout management component manages on-screen objects presented for display by the GUI 110 (e.g., during execution of one or more of the applications 104). FIG. 2 is a diagram illustrating objects within a GUI layout 200 according to an embodiment of the disclosure. The GUI layout 200 includes a main window 201, which serves as a parent window to sub-windows 202 and 220. The main window 201, sub-windows 202 and 220, as well as objects within each of the sub-windows 202 and 220 may be referred to collectively as "objects" or "on-screen objects". Each of the objects may be arranged according to a layout (e.g., a layout associated with the application 104) managed by the layout management component 106.

In some embodiments, the main window 201 may have fixed or pre-defined dimensions (e.g., a horizontal width and a vertical width) that places dimensional constraints on sub-windows 202 and 220. In some embodiments, the main window 201 may be resizable. For example, a change in a dimension of the main window 201 may remove one or more dimensional constrains of the sub-windows 202 and 220, and the sub-windows 202 and 220 may be resized dynamically based on rules of the layout (e.g., which may be specified and managed by the layout management component 106). Similarly, the sub-windows 202 and 220 may also place dimensional constraints their respective objects.

The sub-window 202 contains label objects 204 and 208, and generic objects 206 and 210. The label objects 204 and 208 contain text data, and may be formatted, for example, to have a particular size and font. The generic objects 206 and 210 may include, but are not limited to, labels, windows, checkboxes, radio buttons, buttons, hyperlinks, and scrollbars. The label object 204 is illustrated as spanning the width of the sub-window 202, which may be in accordance with rules of the layout. In some embodiments, a width of the label object 204 (a "label width") may be fixed or dynamically resizable. For example, in some embodiments, the label width of the label object 204 may be updated in response to a change in width of the sub-window 202 in order for the label object 204 to continue to span the sub-window 202. In some embodiments, if the label width of the label object 204 is fixed, the label width of the label object 204 remains the same if the width of the sub-window 202 changes. For example, if the sub-window 202 decreases in width, part of the label object 204 may become hidden, and a scrollbar may be added to the sub-window 202 that provides an option to scroll through the sub-window 202 and view the label object 204 in its entirety. In some embodiments, the layout management component 106 may set a maximum width for the label object 204 in order to prevent the inclusion of a scrollbar within the sub-window 202, and text within the label object 204 may be cropped accordingly.

The label object 208 is illustrated as being in between objects 206 and 210, which may be in accordance with rules of the layout. For example, a label width of the label object 208 may be determined, in part, based on the width (e.g., horizontal width) of the sub-window 202 as well as the respective widths (e.g., horizontal widths) of the objects 206 and 210. In some embodiments, one or more of the objects 206 and 210 may increase in width (horizontal and/or vertical), decrease in width (horizontal and/or vertical), or be removed from the sub-window 202, which may affect the label width of the label object 208 based on the rules of the layout.

The sub-window 220 includes an object 222 (e.g., a scrollbar) and label objects 224, 226, and 228, which may contain text data. In some embodiments, one or more objects within the sub-window 220 may be hidden or partially hidden. For example, the label object 228 is partially visible within the sub-window 220, while a hidden portion 230 is not displayed. If the object 222 is a scrollbar, user interaction with the scrollbar may update the window so that the label object 228 can be viewed in its entirety (which may also result in a portion of the label object 224 being obscured). In some embodiments, a tooltip may be displayed for the label object 228 to display the text of the label object 228 even if the text is un-truncated.

Each of the label objects 204, 208, 224, 226, and 228 include associated text data. For a given label object, the displayed text data may be truncated if a width of the text data exceeds a width of its respective label object, and a tooltip is enabled for the label to display the text data in full, as is described in greater detail below with respect to FIGS. 3 and 4.

Figure 3:
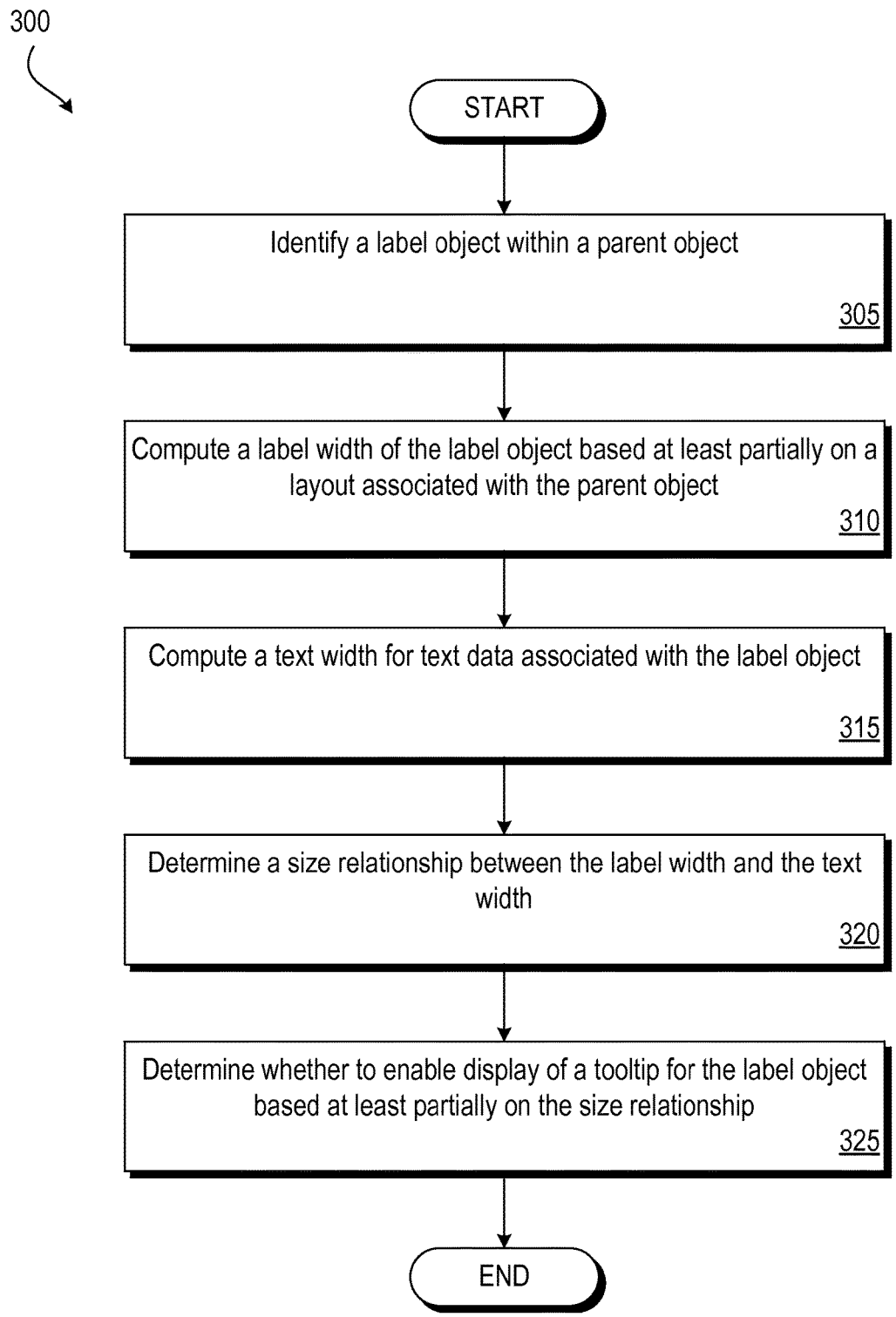
FIG. 3 is a flow diagram illustrating a method for determining a label size according to an embodiment of the disclosure.
Figure 4:
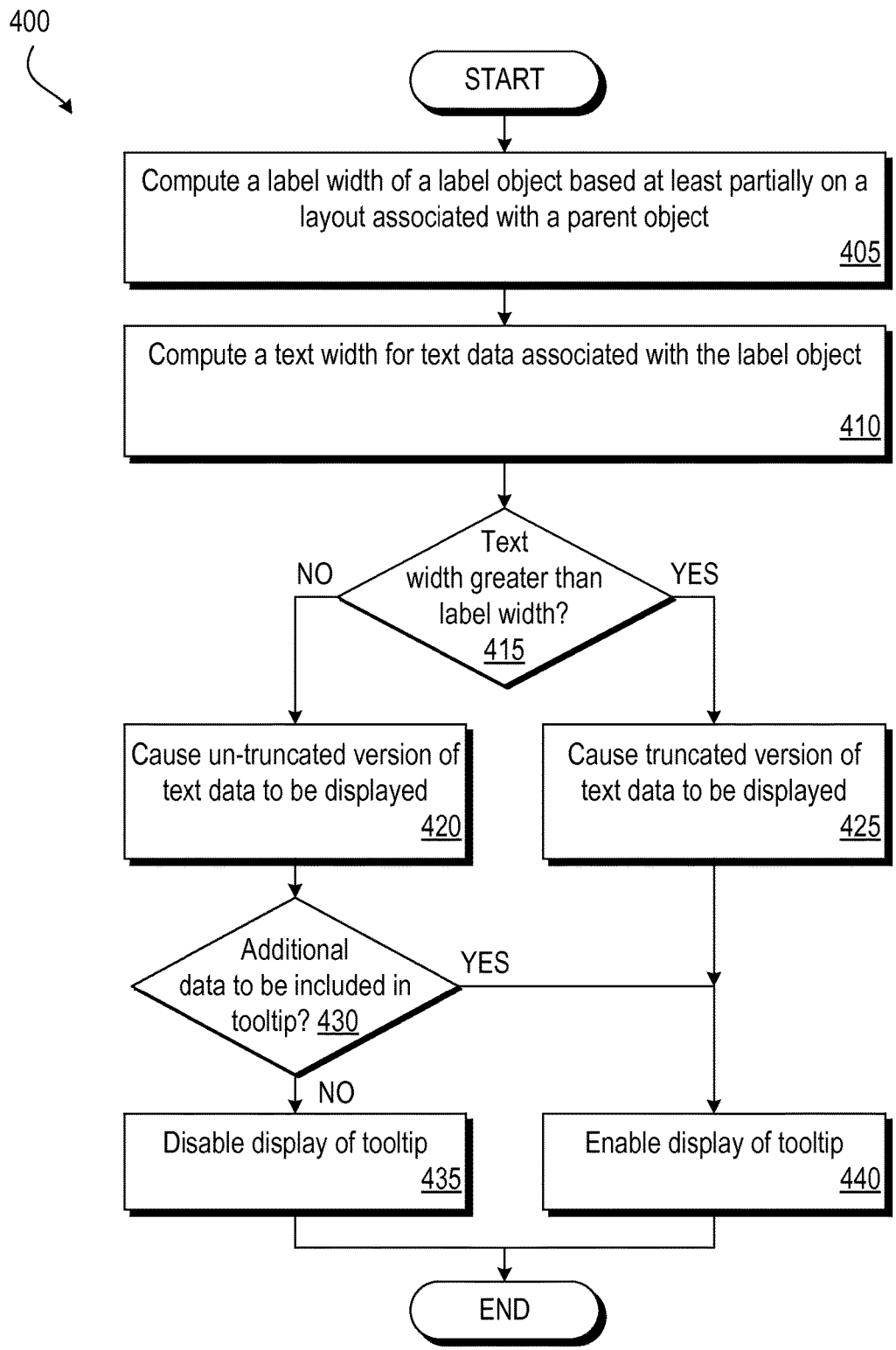
FIG. 4 is a flow diagram illustrating a method for determining conditions for displaying a tooltip according to an embodiment of the disclosure.

FIG. 3 is a flow diagram illustrating a method 300 for determining a label size according to an embodiment of the disclosure. FIG. 4 is a flow diagram illustrating a method 400 for determining conditions for displaying a tooltip according to an embodiment of the disclosure. Methods 300 and 400 may be performed by processing logic that may include hardware (e.g., processing devices, circuitry, dedicated logic, programmable logic, microcode, etc.), software (such as instructions run on a processing device), firmware, or a combination thereof. In some embodiments, the methods 300 and 400 are performed by a processing device implementing the layout management component 106 described with respect to FIG. 1. In describing the methods 300 and 400, reference will be made to FIGS. 5-6, when appropriate, to illustrate various aspects of the methods.

Referring now to FIG. 3, the method 300 begins at block 305 where a processing device identifies a label object within a parent object. For example, the parent object may be a window, such as a main window (e.g., the main window 201) or a sub-window (e.g., the sub-window 202), an element of a table, a drop-down box, or any other on-screen object that may contain a label object.

Reference is now made to FIG. 5A, which illustrates a GUI layout 500 that includes tabulated windows 502 and 504 (with the tabulated window 502 currently displayed in lieu of the tabulated window 504), menu options 506, table header 508, and table elements 510. Each of the table elements 510 includes objects arranged adjacent to each other. For example, table element 512 includes a status indicator 514, a label object 516 (which is represented as a dotted line), and a checkbox 518. The table element 512 acts as a parent object that contains the status indicator 514, the label object 516, and the checkbox 518. The label object is associated with text data having a text string of "nic4_qwertyuiopasdfghjklzxcvbnm". When rendered and displayed in the label object, the text data is truncated to "nic4_qwertyuiopa . . . " (e.g., using the CSS text-overflow property).

Referring once again to FIG. 3, at block 310, the processing device computes a label width of the label object based at least partially on a layout associated with the parent object. In some embodiments, the label width is computed based on one or more of a window containing the label object, a sub-window containing the label object, a scrollbar, or other objects located adjacent to or in the vicinity of the label object (e.g., within the same window or sub-window). For example, as illustrated in FIG. 5A, a label width 520 of the label object 516 is indicated, which may correspond to an overall size of the objects in pixels or another suitable unit of measurement. The label width 520 is constrained between the status indicator 514 and the checkbox 518 and their relative locations within the table element 512 (i.e., parent object).

At block 315, the processing device computes a text width for text data associated with the label object. In some embodiments, the text width corresponds to a width (e.g., in pixels) of text data as it would be rendered on a display screen using a particular font at a particular font size. For example, the font and font size may be pre-defined settings/rules that are associated with the label object.

At block 320, the processing device determines a size relationship between the label width and the text width. In some embodiments, the size relationship includes a determination of a largest value among the label width and the text width.

At block 325, the processing device determines whether to enable display of a tooltip for the label object based at least partially on the size relationship. In one embodiment, if it is determined that the text width is greater than the label width, a truncated version of the text data is displayed by the label and a tooltip is enabled for the label. As illustrated in FIG. 5B, a GUI layout 530 shows a tooltip 532 displayed for the label object 516, which may be displayed in response to a "mouse-over" interaction or a selection of the label object 516.

In some embodiments, the label object may be updated in response to a change in the layout. For example, FIG. 5C illustrates a GUI layout 560 in which a splitter 562 was adjusted, which adjusts the relative locations of objects within table elements 510. The adjustment results in an increase in label width of the label object 516, which in turn causes truncation of the text data at a different location within the label object 516. In response to a change in the layout, the processing device may repeat some or all of the operations of the method 300.

In some embodiments, the layout management component 106 may reduce a size of the font of the text data until the text width is less than the label width, but may truncate the text instead if the reduced font size becomes smaller than a lower size limit.

In some embodiments, the processing device may determine that the text width of the text data has changed in response to translation of the text data into a different language (e.g., by updated text data received from the localization server 140). Accordingly, the processing device may repeat some or all of the operations of the method 300 to dynamically update the label object.

Referring now to FIG. 4, the method 400 begins at block 405 where a processing device computes a label width of the label object based at least partially on a layout associated with a parent object. Block 405 may be performed in a substantially similar fashion as block 310 described with respect to FIG. 3.

At block 410, the processing device computes a text width for text data associated with the label object. Block 410 may be performed in a substantially similar fashion as block 315 described with respect to FIG. 3.

At block 415, the processing device determines whether the text width is greater than the label width. If the text width is not greater than the label width, then method 400 proceeds to block 420, where the processing device causes an untruncated version of the text data of the label object to be displayed (e.g., by a display device). The method 400 then proceeds to block 430. Otherwise, if the text width is greater than the label width, method 400 proceeds to block 425, where the processing device causes a truncated version of the text data of the label object to be displayed (e.g., by the display device). The method 400 then proceeds to block 440.

Figure 6A:
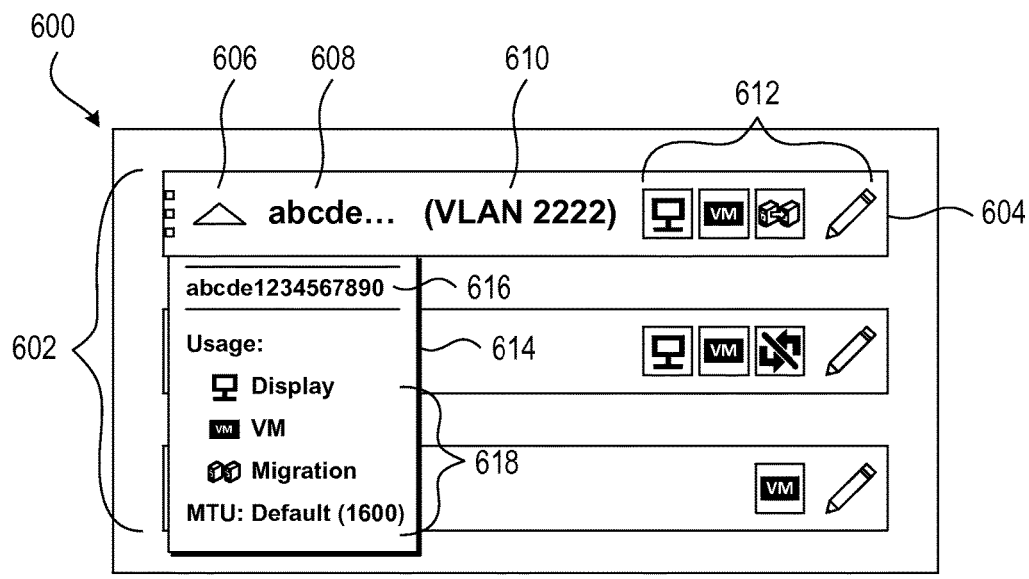
FIG. 6A shows an illustrative layout that includes a tooltip to display information associated with a collection of objects according to an embodiment of the disclosure.

Reference is now made to FIG. 6A, which illustrates a GUI layout 600 that includes windows 602. Window 604 includes several objects, such as a status indicator 606, a label object 608, a label object 610, and network options 612. The label object 608 is associated with text data having a text string of "abcde1234567890", which appears truncated in the GUI layout 600 (e.g., according to block 425). A tooltip 614 is displayed to reveal un-truncated text data 616.

Figure 6B:
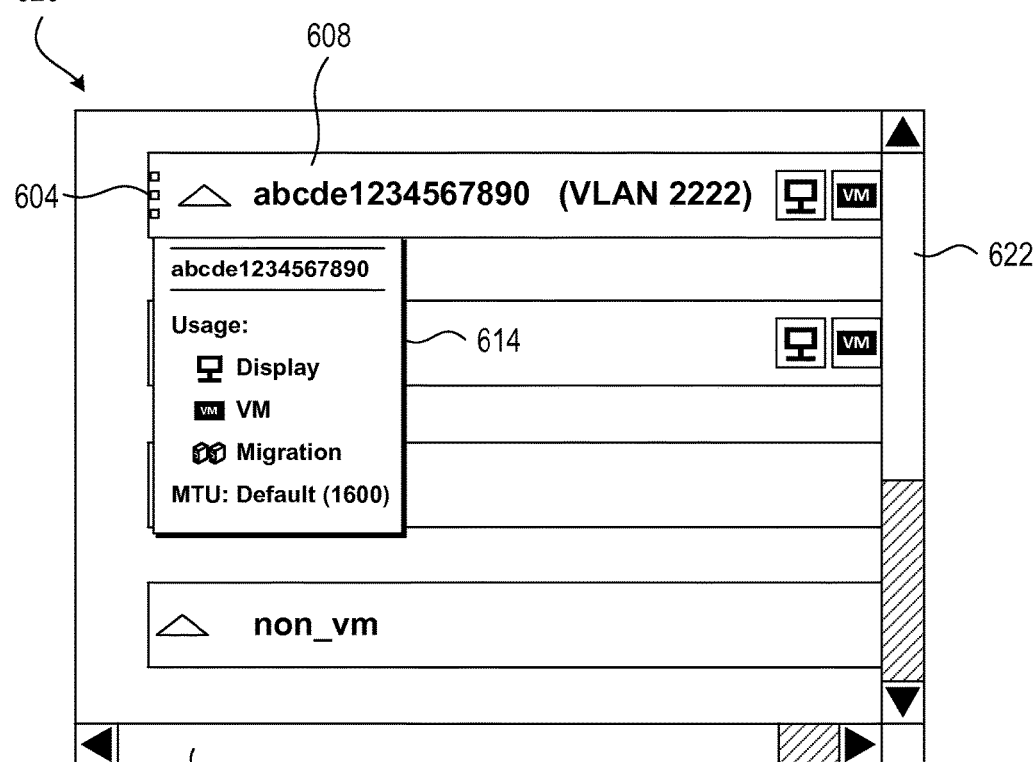
FIG. 6B shows an illustrative layout that includes a tooltip for an un-truncated label according to an embodiment of the disclosure.

Reference is now made to FIG. 6B, which illustrates a GUI layout 620 that includes the window 604. The GUI layout 620 is an example of a different layout or a modified version of the GUI layout 600 into which the window 604 has been moved or imported, resulting in a change in dimensions of the window 604. The GUI layout 620 also includes scrollbars 622 and 624 for adjusting the visibility of objects within the GUI layout 620. As illustrated, the text data appears un-truncated in the GUI layout 600 (e.g., according to block 420).

Referring once again to FIG. 4, at block 430, the processing device determines whether additional data is to be included in a tooltip (e.g., a tooltip 614 associated with the label object 608 that is to appear, for example, in response to a "mouse-over" interaction with the label object). In some embodiments, the additional data may correspond to data that is prevented from being displayed within the layout associated with the parent object. If there is additional data to be included in the tooltip, then method 400 proceeds to block 440 where the processing device enables display of the tooltip. For example, even though the text data of the label object 608 is un-truncated, the tooltip 614 may be displayed if additional data 618 is to be displayed according to layout rules (e.g., rules managed by the layout management component 106). The additional data 618 may be associated with, for example, the network options 612 (which may include names of the network options 612 or other relevant information) within the window 604. In some embodiments, the tooltip (e.g., the tooltip 614) may appear as a result of interaction with other objects associated with the tooltip (e.g., the network options 612).

If the processing device determines that no additional data is to be displayed in the tooltip, then the method 400 proceeds to block 435 where the processing device disables display of the tooltip.

In some embodiments, the method 400 is repeated each time the layout management component 106, as implemented by the processing device, determines that a change in the layout has occurred, or that text data for one or more label objects has been changed or updated (e.g., in response to translated text data received from the localization server 140, in response to receiving updated data from the web server 130, etc.).

In some embodiments, less than all of the blocks of the method 400 may be performed. For example, if one or more dimensions of the layout have changed (e.g., a label width) but the text data is unchanged, then block 405 may be executed to compute an updated label width of the label object (e.g., based at least partially on the layout associated with the parent object), and block 410 may be omitted. Similarly, if text data has changed but the dimensions of the layout are unchanged, then block 410 may be executed, and block 405 may be omitted. In either case, the processing device determines an updated size relationship between the label width and the text width.

For simplicity of explanation, the methods of this disclosure are depicted and described as a series of acts. However, acts in accordance with this disclosure can occur in various orders, concurrently, and/or with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture, such as a computer-readable device or storage media, to facilitate transporting and transferring such methods to computing devices. Accordingly, the term "article of manufacture", as used herein, is intended to include a computer program accessible from any computer-readable device or storage media.

Figure 7:
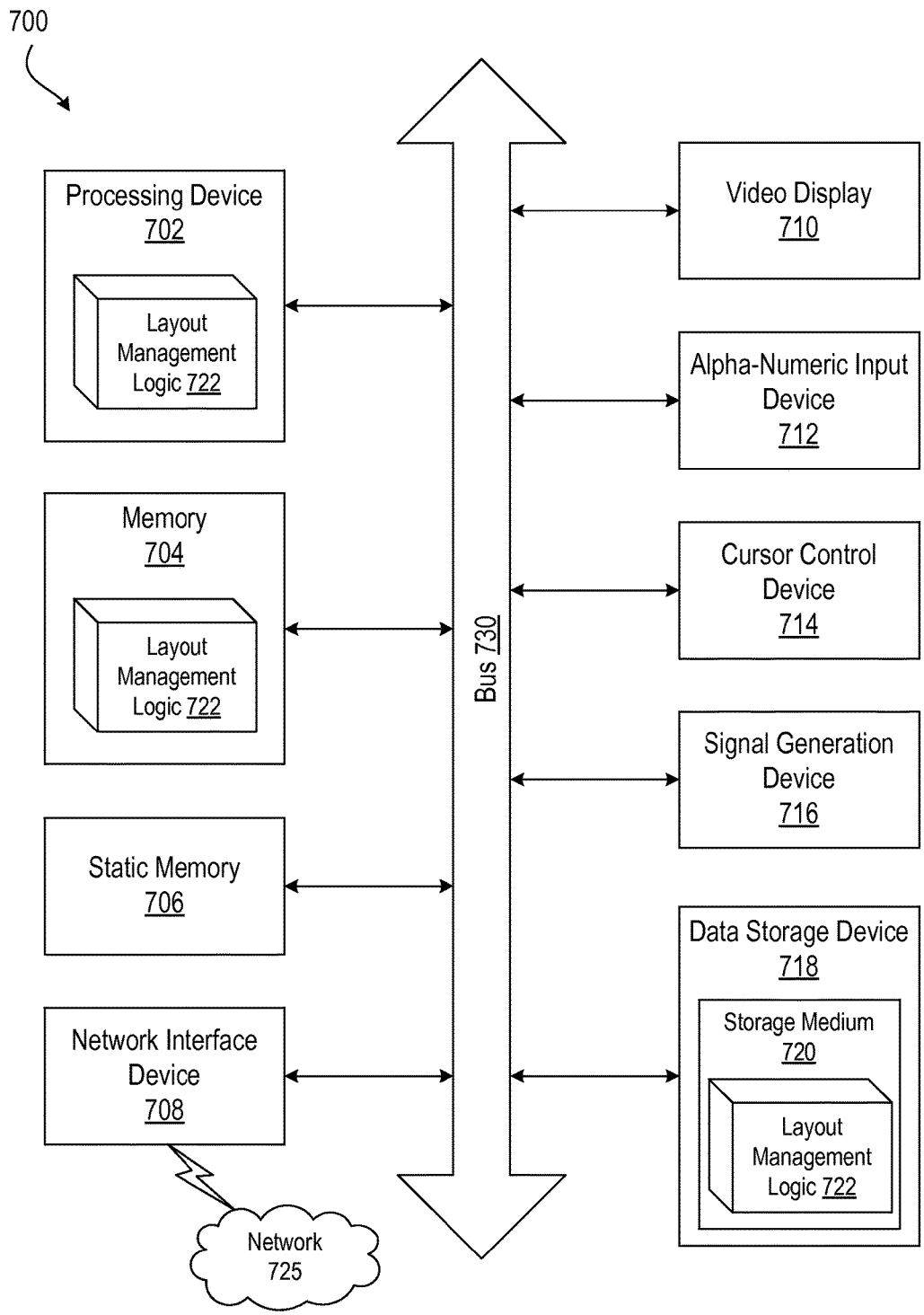
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute layout management logic 722 for performing the operations and steps discussed herein. In one embodiment, the layout management component 106, described with respect to FIG. 1, performs the layout management logic 722.

The computer system 700 may further include a network interface device 708. The computer system 700 may also include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium (or more specifically a computer-readable storage medium) 720 on which is stored one or more sets of instructions (e.g., the layout management logic 722) embodying any one or more of the methodologies of functions described herein. The layout management logic 722 may also reside, completely or at least partially, within the memory 704 (and/or the memory 706) and/or within the processing device 702 during execution thereof by the computer system 700, with the memory 704 and the processing device 702 constituting machine-accessible storage media. In one embodiment, the layout management logic 722 provides the same functionality as the layout management component 106 described with respect to FIG. 1.

The machine-readable storage medium 720 may also be used to store the layout management logic 722 persistently containing methods that call the above applications. While the computer-readable storage medium 720 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media. The term "machine-accessible storage medium" shall also be taken to including machine-readable or computer-readable storage media (e.g., non-transitory computer-readable storage media).

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the preceding discussion, it is appreciated that throughout the description, discussions utilizing terms such as "receiving", "storing", "identifying", "computing", "causing", "enabling", "disabling", "updating", "setting", "comparing", "generating", "preventing", "notifying", "modifying", "rendering", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may include a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    identifying, by a processing device, a label object within a parent object of a graphical user interface generated by the processing device;
    computing, by a processing device, a label width of the label object in view of a layout associated with the graphical user interface (GUI), the layout comprising rules prescribing an arrangement of objects in the GUI, wherein the objects comprise at least the parent object and the label object;
    computing a text width for text data associated with the label object;
    determining a size relationship between the label width and the text width;
    determining to truncate, via the GUI, the text data associated with the label object in view of the size relationship;
    identifying secondary data that is associated with the parent object and is prevented from being displayed within the layout associated with the parent object;
    and determining to enable display, via the GUI, of a tooltip for the label object in view of the size relationship and in view of the secondary data being prevented from display within the layout, wherein the tooltip comprises the secondary data in addition to the text data.

2. The method of claim 1, wherein the size relationship comprises a determination of a largest value among the label width and the text width.

3. The method of claim 2, further comprising:
    in response to determining that the text width is the largest value:
        causing a truncated version of the text data to be displayed; and
        enabling the display of the tooltip for the label object, wherein the tooltip is to include an un-truncated version of the text data.

4. The method of claim 2, further comprising:
    in response to determining that the label width is the largest value:
        causing an un-truncated version of the text data to be displayed; and
        disabling the display of the tooltip for the label object.

5. The method of claim 2, further comprising:
    in response to determining that the label width is the largest value:
        causing an un-truncated version of the text data to be displayed; and
        enabling the display of the tooltip for the label object, wherein the tooltip is to include the un-truncated version of the text data and the secondary data associated with the parent object.

6. The method of claim 1, further comprising:
    determining that one or more of the layout associated with the parent object or the text width of the text data has changed;
    computing an updated label width of the label object based at least partially on the layout associated with the parent object; and
    determining an updated size relationship between the updated label width and the text width; and
    determining whether to enable display of the tooltip for the label object based at least partially on the updated size relationship.

7. The method of claim 6, further comprising:
    determining that the text width of the text data has changed in response to translation of the text data into a different language.

8. A system comprising:
    a non-transitory memory; and
    a hardware processing device communicatively coupled to the memory, wherein the hardware processing device is to:
    receive an indication to update a label object of a graphical user interface(GUI) generated by the processing device;
    in response to receiving the indication, compute a label width of the label object in view of a layout associated with the GUI, the layout comprising rules prescribing an arrangement of objects in the GUI, wherein the objects comprise at least a parent object and the label object;
    determine whether a text width of text data associated with the label object is greater than the label width;
    in response to determining that the text width is greater than the label width, cause a truncated version of the text data to be displayed;
    in response to determining that the text width is less than the label width, cause an un-truncated version of the text data to be displayed;
    identify secondary data that is associated with the parent object and is prevented from being displayed within the layout associated with the parent object; and
    determine whether to enable display, via the GUI, of a tooltip for the label object in view of the size relationship and in view of the secondary data being prevented from display within the layout, wherein the tooltip comprises the secondary data in addition to the text data.

9. The system of claim 8, wherein in response to determining that the text width is less than the label width, the processing device is further to:
    determine whether additional data is available to be included in a tooltip associated with the label object;
    in response to determining that the additional data is available to be included, enable display of the tooltip; and
    in response to determining that the additional data is not available to be included, disable display of the tooltip.

10. The system of claim 8, wherein the processing device is further to:
    in response to determining that the text width is greater than the label width, enable display of a tooltip associated with the label object.

11. The system of claim 8, wherein the processing device is further to: identify the label object within the parent object.

12. The system of claim 11, wherein, to compute the label width of the label object, the processing device is further to: compute the label width of the label object based at least partially on a layout associated with the parent object.

13. The system of claim 8, wherein the indication to update the label object comprises an indication that the text data has been translated into a different language, and wherein the processing device is further to:
compute an updated text width based on the translated text data.

14. The system of claim 8, wherein the indication to update the label object comprises an indication that a layout associated with the parent object has changed.

15. A non-transitory computer-readable storage medium including instructions that, when executed by a processing device, cause the processing device to:
identify, by the processing device, a label object within a parent object of a graphical user interface(GUI) generated by the processing device;
compute a label width of the label object in view of a layout associated with the GUI, the layout comprising rules prescribing an arrangement of objects in the GUI, wherein the objects comprise at least the parent object and the label object;
compute a text width for text data associated with the label object;
determine a size relationship between the label width and the text width;
determine whether to truncate, via the GUI, the text data associated with the label object in view of the size relationship;
identify secondary data that is associated with the parent object and is prevented from being displayed within the layout associated with the parent object; and
determine whether to enable display, via the GUI, of a tooltip for the label object in view of the size relationship and in view of the secondary data being prevented from display within the layout, wherein the tooltip comprises the secondary data in addition to the text data.

16. The non-transitory computer-readable storage medium of claim 15, wherein the size relationship comprises a determination of a largest value among the label width and the text width.

17. The non-transitory computer-readable storage medium of claim 16, wherein the instructions further cause the processing device to:
in response to determining that the text width is the largest value:
cause a truncated version of the text data to be displayed; and
enable the display of the tooltip for the label object, wherein the tooltip is to include an un-truncated version of the text data.

18. The non-transitory computer-readable storage medium of claim 16, wherein the instructions further cause the processing device to:
in response to determining that the label width is the largest value:
cause an un-truncated version of the text data to be displayed; and disable the display of the tooltip for the label object.

19. The non-transitory computer-readable storage medium of claim 16, wherein the instructions further cause the processing device to:
in response to determining that the label width is the largest value:
cause an un-truncated version of the text data to be displayed; and
enable the display of the tooltip for the label object, wherein the tooltip is to include the un-truncated version of the text data and the secondary data associated with the parent object.

20. The non-transitory computer-readable storage medium of claim 15, wherein the instructions further cause the processing device to:
determine that one or more of the layout associated with the parent object or the text width of the text data has changed;
compute an updated label width of the label object based at least partially on the layout associated with the parent object; and
determine an updated size relationship between the updated label width and the text width; and
determine whether to enable display of the tooltip for the label object based at least partially on the updated size relationship.

* * * * *